United States Patent
Chen

(10) Patent No.: US 11,739,784 B2
(45) Date of Patent: Aug. 29, 2023

(54) METHOD FOR INTEGRALLY FORMING A STOP FLANGE ON A SELF-TAPPING SCREW BY THREADING DIES

(71) Applicant: Wei-Chih Chen, Taichung (TW)

(72) Inventor: Wei-Chih Chen, Taichung (TW)

( * ) Notice: Subject to any disclaimer, the term of this patent is extended or adjusted under 35 U.S.C. 154(b) by 475 days.

(21) Appl. No.: 17/083,683

(22) Filed: Oct. 29, 2020

(65) Prior Publication Data

US 2021/0040976 A1 Feb. 11, 2021

Related U.S. Application Data

(63) Continuation-in-part of application No. 16/157,189, filed on Oct. 11, 2018, now abandoned.

(51) Int. Cl.

| | | |
|---|---|---|
| *B21H 3/04* | (2006.01) | |
| *F16B 25/00* | (2006.01) | |
| *F16B 25/10* | (2006.01) | |
| *B21H 3/02* | (2006.01) | |
| *B21H 3/06* | (2006.01) | |

(52) U.S. Cl.
CPC ......... *F16B 25/0063* (2013.01); *B21H 3/027* (2013.01); *B21H 3/06* (2013.01); *F16B 25/103* (2013.01)

(58) Field of Classification Search
CPC .............. F16B 25/0063; F16B 25/0031; F16B 25/0036; B21H 3/027; B21H 3/06; B21H 3/04; B21H 3/042
See application file for complete search history.

(56) References Cited

U.S. PATENT DOCUMENTS

| | | | | |
|---|---|---|---|---|
| 2,823,574 A | | 2/1958 | Rosan | |
| 3,818,749 A | * | 6/1974 | Yankee | B21H 3/027 411/308 |
| 3,835,694 A | * | 9/1974 | Skierski | B21H 3/027 72/469 |
| 3,896,656 A | * | 7/1975 | Orlomoski | B21H 3/06 72/469 |
| 3,972,084 A | * | 8/1976 | Reynolds | F16B 33/02 118/409 |
| 3,981,170 A | * | 9/1976 | Barth | B23P 19/08 470/4 |

(Continued)

FOREIGN PATENT DOCUMENTS

| | | | | | |
|---|---|---|---|---|---|
| EP | 432484 A | * | 6/1991 | | E04B 1/164 |
| EP | 0432484 A2 | | 6/1991 | | |

*Primary Examiner* — Jun S Yoo
(74) *Attorney, Agent, or Firm* — Alan D. Kamrath; Karin L. Williams; Mayer & Williams PC

(57) ABSTRACT

A method for forming a stop flange on a self-tapping screw includes locating a shank of a self-tapping screw between two threading dies, fixing one of the two threading dies and moving the other one of the two threading dies to work the shank, the external thread forming section of each of the threading dies performing threading to form an external thread on the shank, inserting the insert and the recessed corner of each of the threading dies into a top of the external thread to form a groove in the shank, and the insert of each of the threading dies gradually squeezing downward an extruded portion that is formed during formation of the groove to form a stop flange on the shank. Thus, the shank is integrally formed with the stop flange, to stop an excessive movement of the external thread.

6 Claims, 15 Drawing Sheets

(56) References Cited

U.S. PATENT DOCUMENTS

| | | | |
|---|---|---|---|
| 4,212,224 A | | 7/1980 | Bragg, Jr. et al. |
| 4,259,758 A | * | 4/1981 | Owen .................... B21H 3/027 |
| | | | 470/10 |
| 4,365,958 A | | 12/1982 | Vlock |
| 4,546,639 A | * | 10/1985 | Corrette ................. B21H 3/027 |
| | | | 72/469 |
| 4,655,073 A | * | 4/1987 | Yamamoto .......... F16B 25/0021 |
| | | | 470/85 |
| 4,764,069 A | | 8/1988 | Reinwall et al. |
| 5,810,670 A | | 9/1998 | Yamamuro et al. |
| 9,140,001 B1 | | 9/2015 | Hohmann, Jr. |
| 2010/0218443 A1 | | 9/2010 | Studebaker et al. |
| 2013/0232909 A1 | | 9/2013 | Curtis et al. |
| 2019/0368529 A1 | * | 12/2019 | Mair ..................... F16B 25/103 |
| 2020/0011362 A1 | | 1/2020 | Lai |
| 2021/0199148 A1 | * | 7/2021 | Chen ................... F16B 25/0063 |

* cited by examiner

B-B

METHOD FOR INTEGRALLY FORMING A STOP FLANGE ON A SELF-TAPPING SCREW BY THREADING DIES

CROSS-REFERENCES TO RELATED APPLICATIONS

The present invention is a continuation-in-part (C.I.P.) application of the co-pending U.S. Ser. No. 16/157,189, filed on Oct. 11, 2018.

BACKGROUND OF THE INVENTION

1. Field of the Invention

The present invention relates to a self-tapping screw and, more particularly, to a method for integrally forming a stop flange on a self-tapping screw by threading dies.

2. Description of the Related Art

A first conventional self-tapping screw in accordance with the prior art shown in FIGS. 1 and 2 comprises a shank 10 and a headless screw 16 connected with the shank 10. The shank 10 has a front end provided with a fixing plate 11 disposed horizontally. The fixing plate 11 has a top provided with a rotation head 12 disposed vertically. The rotation head 12 is provided with a through hole 13. Thus, the rotation head 12 is rotated by a driving tool to rotate the shank 10. The shank 10 has a rear end provided with a mounting tube 14 which has an interior provided with an internal thread 15. The headless screw 16 is screwed into the internal thread 15 of the mounting tube 14 and has a rear end provided with a tip 17. A stepped face 18 is defined between the mounting tube 14 and the headless screw 16. The shank 10 and the headless screw 16 are made individually, and the headless screw 16 is then screwed into the internal thread 15 of the shank 10. However, the headless screw 16 is easily fed and locked excessively due to an undue working, an erroneous assembly process or improper operation of the user, so that the headless screw 16 is easily worn out or broken during operation.

A second conventional self-tapping screw in accordance with the prior art shown in FIGS. 3 and 4 comprises a shank 20 and a headless screw 27 connected with the shank 20. The shank 20 has a front end provided with an enlarged portion 21 which has a top provided with a fixing plate 22 disposed horizontally. The fixing plate 22 has a top provided with a rotation head 23 disposed vertically. The rotation head 23 is provided with a through hole 24. Thus, the rotation head 23 is rotated by a driving tool to rotate the shank 20. The shank 20 has a rear end provided with a mounting tube 25 which has an interior provided with an internal thread 26. The headless screw 27 is screwed into the internal thread 26 of the mounting tube 25 and has a rear end provided with a tip 28. A stepped face 29 is defined between the mounting tube 25 and the headless screw 27. The shank 20 and the headless screw 27 are made individually, and the headless screw 27 is then screwed into the internal thread 26 of the shank 20. However, the headless screw 27 is easily fed and locked excessively due to an undue working, an erroneous assembly process or improper operation of the user, so that the headless screw 27 is easily worn out or broken during operation.

The closest prior art reference(s) of which the applicant is aware was/were disclosed in U.S. Application No. 2020/0011362 to Lai. In the Lai reference, it disclosed a self-tapping screw comprising a shank 10 having a rear end provided with a drilling tip 24 and an external thread 23. The external thread 23 has a top formed with a protrusion 16. The protrusion 16 has a diameter greater than that of the external thread. The protrusion 16 is used to seal the hole 62 drilled on the wall 60. The shank 10 is covered by a rubber cover 40.

BRIEF SUMMARY OF THE INVENTION

The primary objective of the present invention is to provide a self-tapping screw with a stop flange that is formed by two threading dies or thread rolling dies.

In accordance with the present invention, there is provided a method for forming a stop flange on a self-tapping screw, comprising:

locating a shank of a self-tapping screw between two threading dies;

each of the two threading dies having an external thread forming section;

each of the two threading dies having a notch located at a top of the external thread forming section;

the notch including an upper ramp and a lower ramp;

the notch having a dimension decreased gradually from a starting position to an ending position thereof;

the notch having a top provided with an insert;

the insert having a dimension increased gradually from a starting position to an ending position thereof;

the insert having a top provided with a recessed corner;

the recessed corner having a flat shape;

fixing one of the two threading dies and moving the other one of the two threading dies to work the shank of the self-tapping screw;

the external thread forming section of each of the two threading dies performing threading to form an external thread on the shank of the self-tapping screw;

inserting the insert and the recessed corner of each of the two threading dies into a top of the external thread to form a groove in the shank of the self-tapping screw; and the insert of each of the two threading dies gradually squeezing downward an extruded portion that is formed during formation of the groove to form a stop flange on the shank of the self-tapping screw by the extruded portion.

Preferably, the external thread forming section of each of the two threading dies performs threading, and the insert of each of the two threading dies performs squeezing simultaneously, to form the external thread and the stop flange on the shank of the self-tapping screw simultaneously.

Preferably, the extruded portion formed during formation of the groove is gradually squeezed and extruded downward to form the stop flange by pressing of the notch having a dimension decreased gradually from a starting position to an ending position thereof and by pressing of the insert having a dimension increased gradually from a starting position to an ending position thereof.

Preferably, the method further comprising the upper ramp of the notch of each of the two threading dies gradually squeezing the stop flange of the self-tapping screw to form a conic face on the stop flange of the self-tapping screw.

Preferably, each of the two threading dies is provided with an antiskid section located at a starting position of the external thread forming section, and the shank of the self-tapping screw is located between the two threading dies and clamped by the antiskid section of each of the two threading dies.

Preferably, each of the two threading dies is provided with an opening and a plane corresponding to a drilling tip of the shank, the plane has a rear end provided with an arcuate face, and the drilling tip of the shank extends into and is hidden in the opening during threading of the external thread and during squeezing of the stop flange.

According to the primary advantage of the present invention, the external thread forming section of each of the two threading dies performs threading on the rotating shank, and the notch of each of the two threading dies performs squeezing on the rotating shank simultaneously, such that the shank is integrally formed with the external thread and the stop flange.

According to another advantage of the present invention, the shank is integrally formed with the stop flange, to stop and prevent the external thread from being fed and locked excessively due to an undue working, an erroneous assembly process or improper operation of the user, thereby preventing the shank from being worn out or broken during operation.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
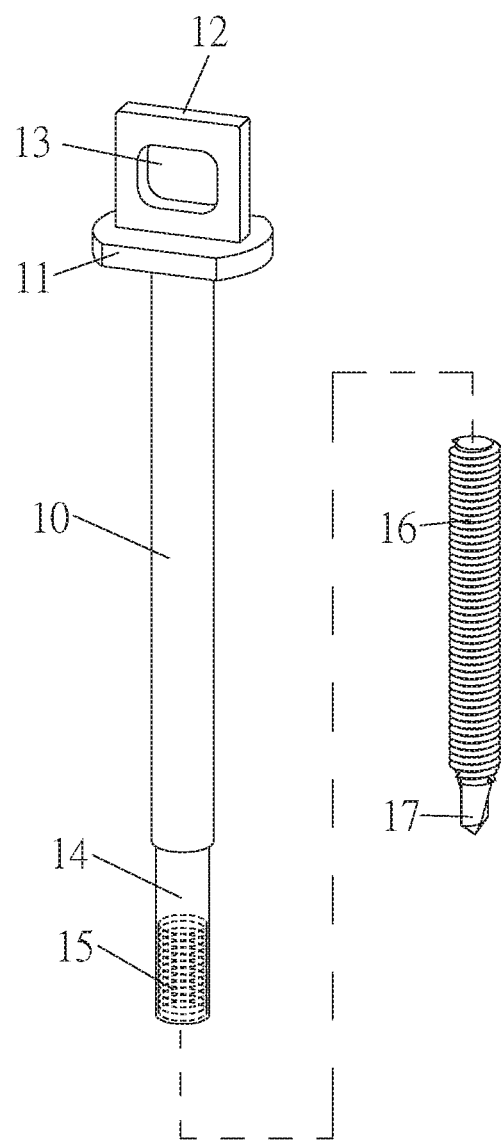
FIG. 1 is an exploded perspective view of a first conventional self-tapping screw in accordance with the prior art.
Figure 2:
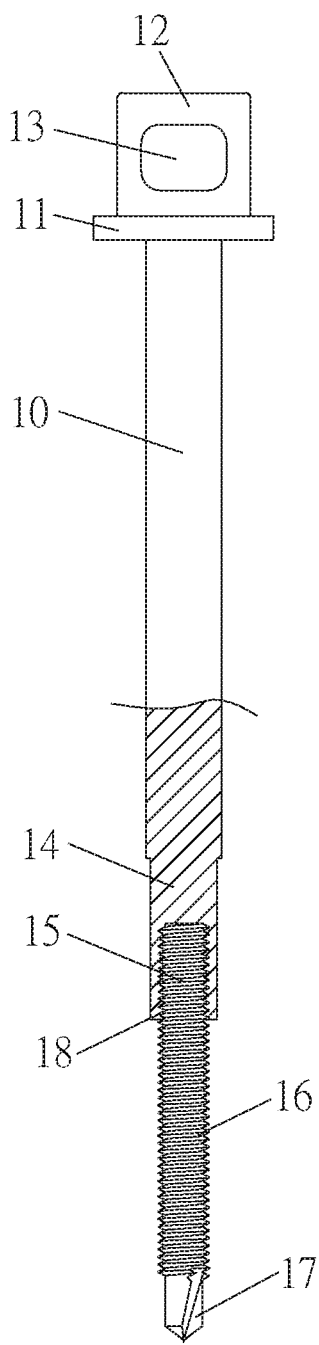
FIG. 2 is a cross-sectional assembly view of the first conventional self-tapping screw in accordance with the prior art.
Figure 3:
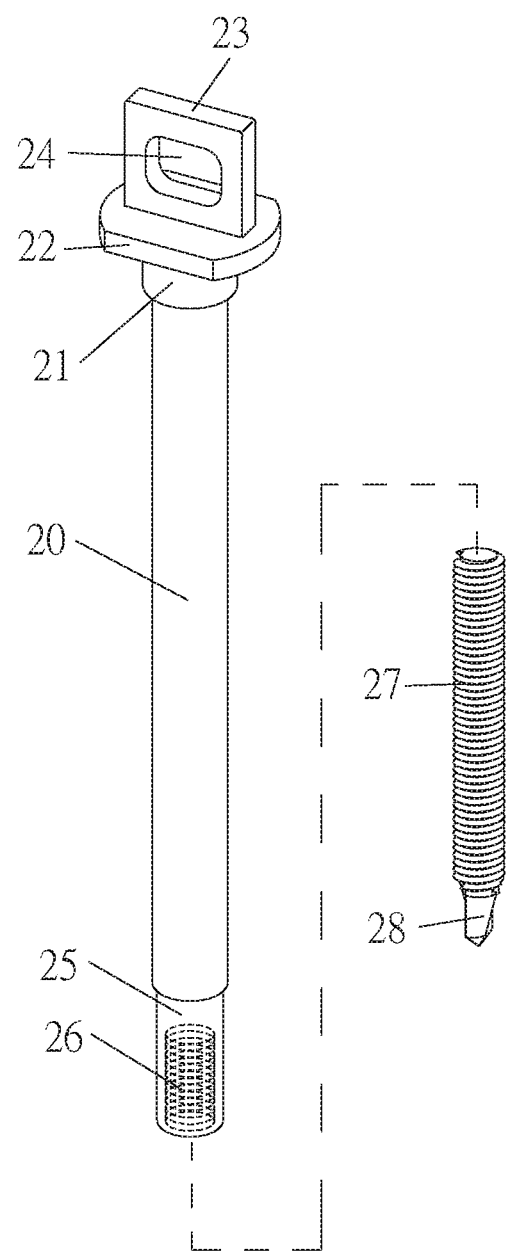
FIG. 3 is an exploded perspective view of a second conventional self-tapping screw in accordance with the prior art.
Figure 4:
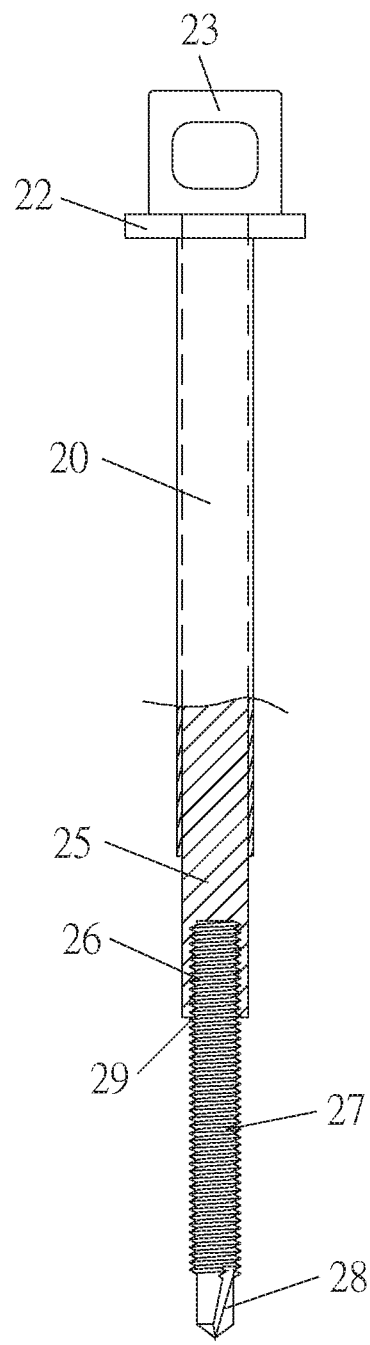
FIG. 4 is a cross-sectional assembly view of the second conventional self-tapping screw in accordance with the prior art.
Figure 5:
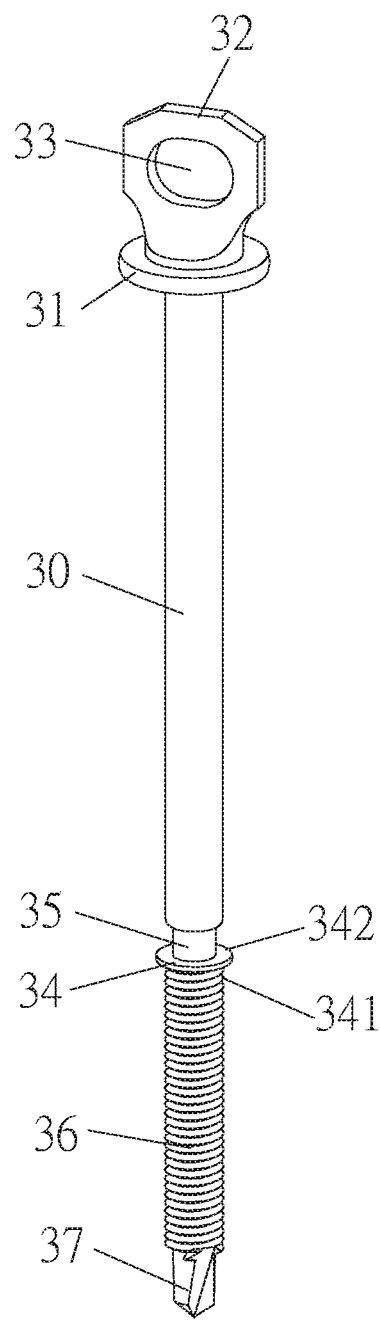
FIG. 5 is a perspective view of a self-tapping screw in accordance with the preferred embodiment of the present invention.
Figure 6:
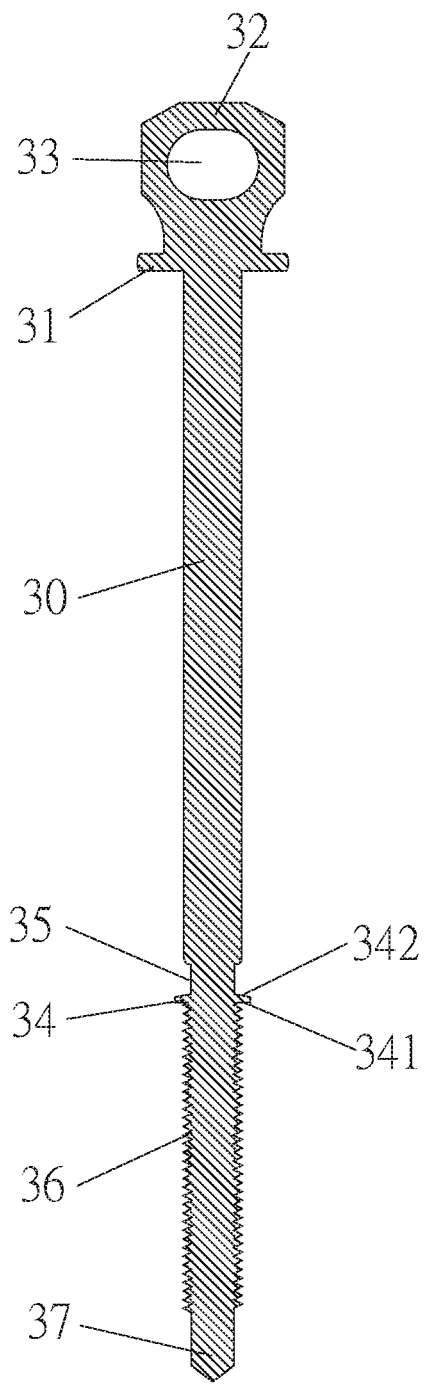
FIG. 6 is a cross-sectional view of the self-tapping screw in accordance with the preferred embodiment of the present invention.

Referring to the drawings and initially to FIGS. 5 and 6, a self-tapping screw in accordance with the preferred embodiment of the present invention comprises a shank 30 having a rear end provided with a drilling tip 37 and an external thread 36. The external thread 36 has a top formed with a stop flange 34 to stop a further movement of the external thread 36. The stop flange 34 has a diameter greater than that of the external thread 36. The stop flange 34 has a bottom provided with a flat face 341 and a top provided with a conic face 342. The stop flange 34 has a position that is adjusted according to the thickness of a workpiece. The shank 30 is provided with a groove 35 located above the stop flange 34. The shank 30 has a front end provided with a fixing plate 31 disposed horizontally. The fixing plate 31 has a top provided with a rotation head 32 disposed vertically. Preferably, the rotation head 32 is a sheet plate and provided with a through hole 33. Thus, the rotation head 32 is rotated by a driving tool to rotate the shank 30.

Figure 7:
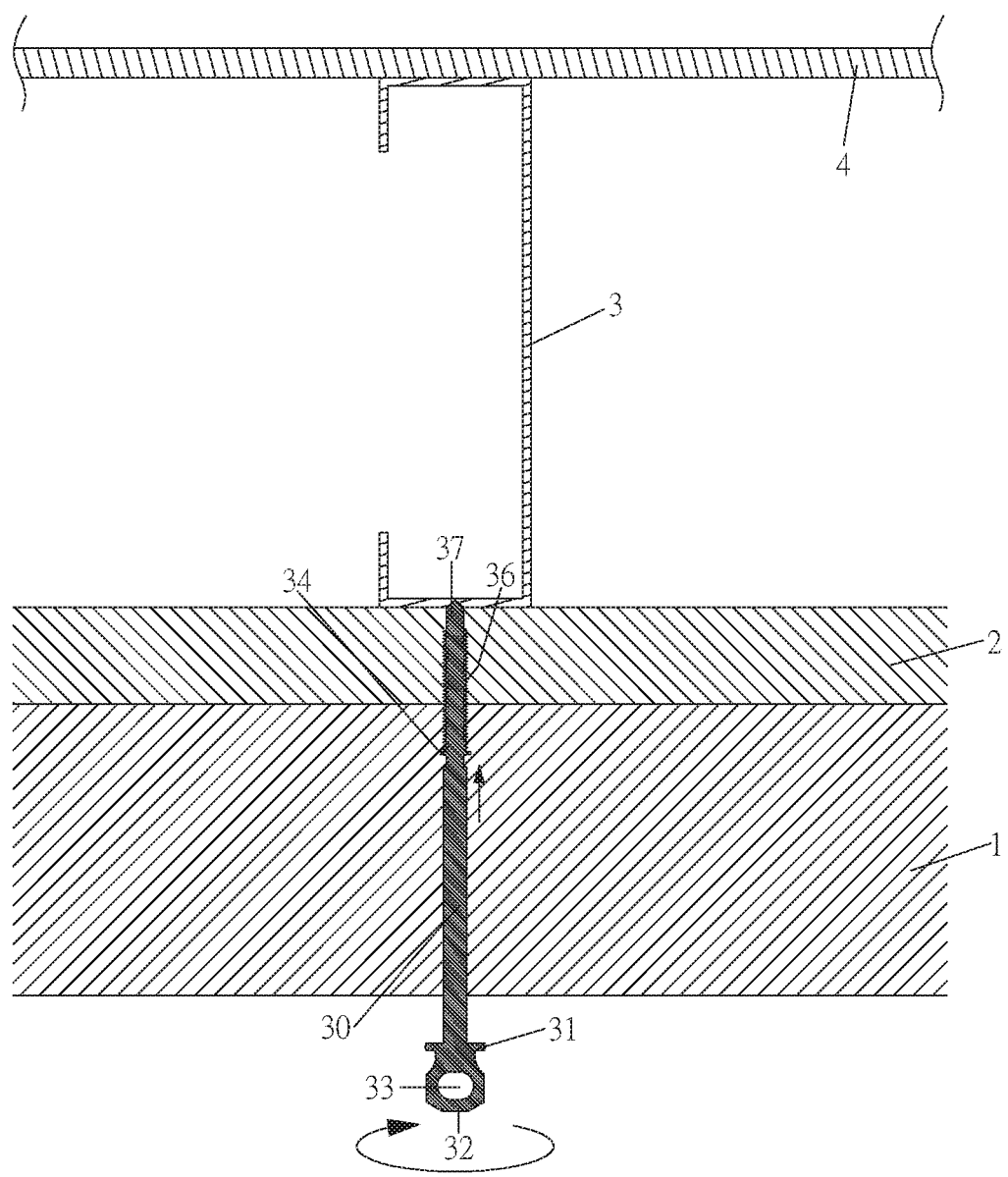
FIG. 7 is a schematic cross-sectional operational view showing a locking state of the self-tapping screw during working.
Figure 8:
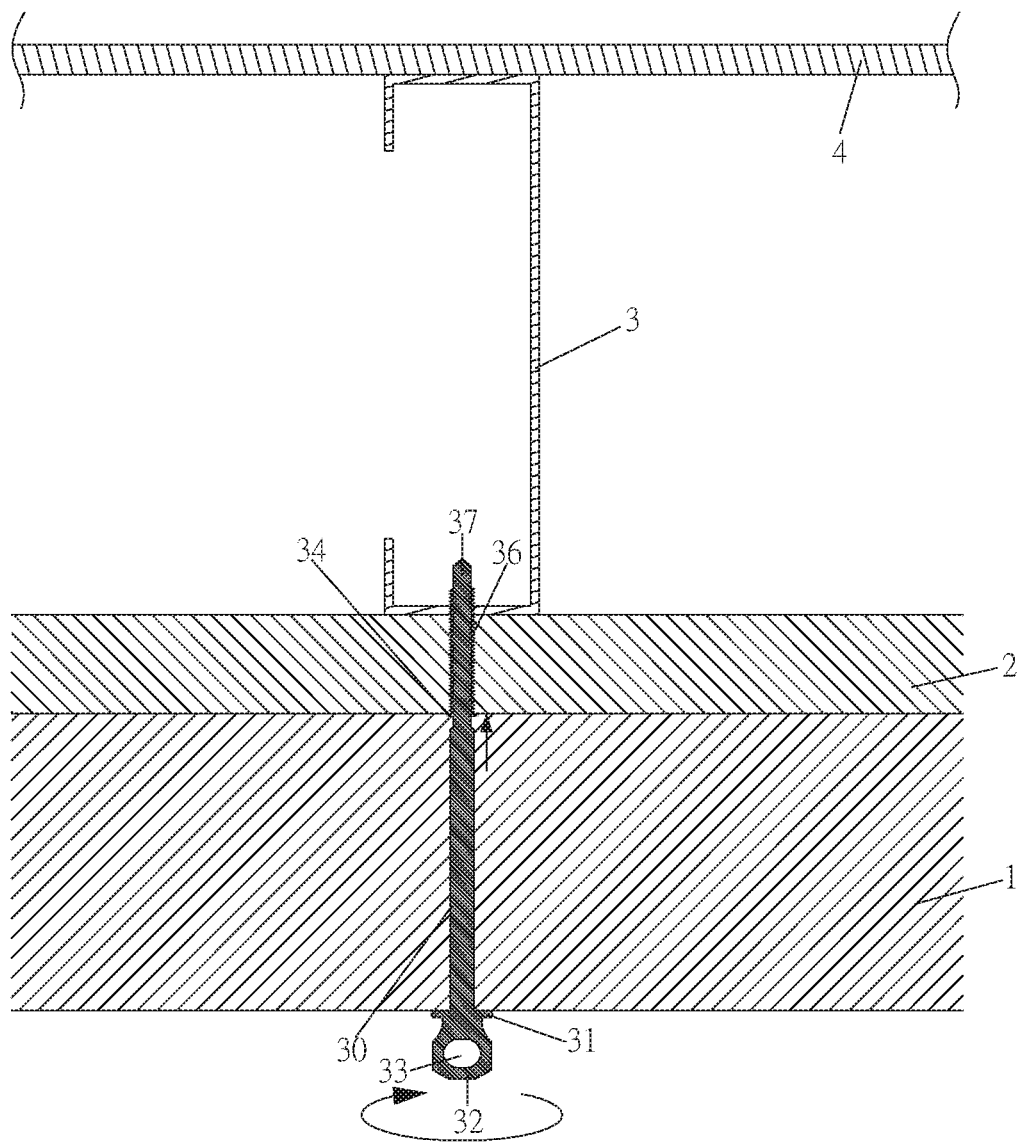
FIG. 8 is a schematic cross-sectional operational view showing a finished state of the self-tapping screw during working.
Figure 9:
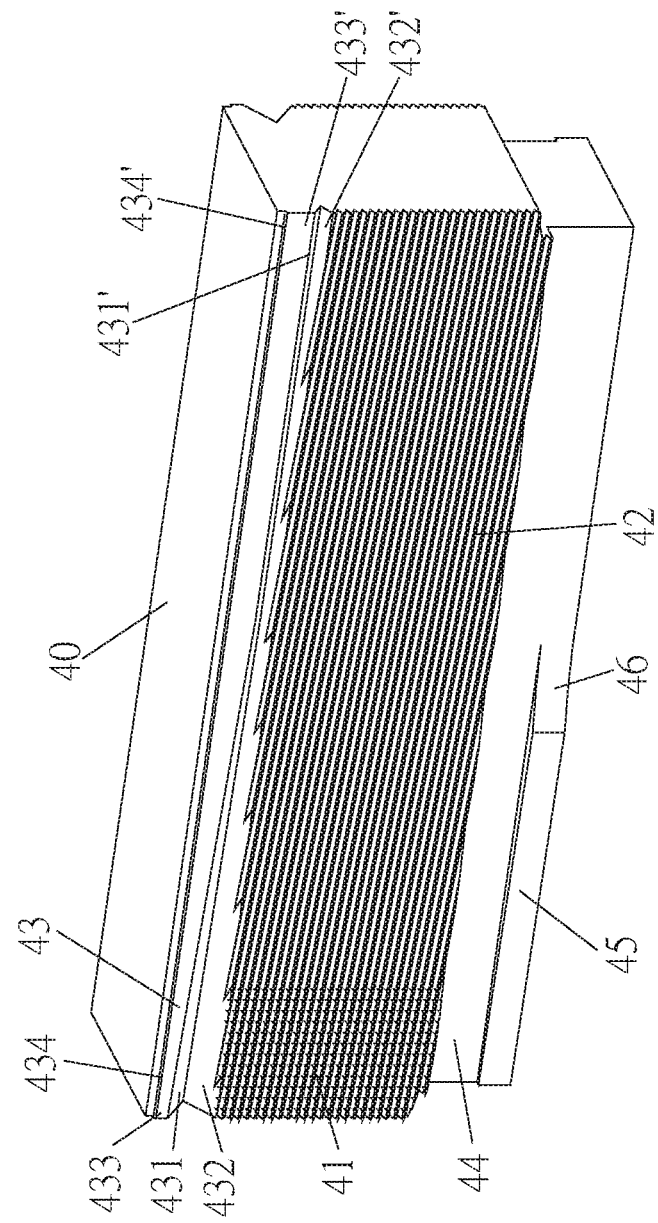
FIG. 9 is a perspective view of a threading die in accordance with the preferred embodiment of the present invention.
Figure 10:
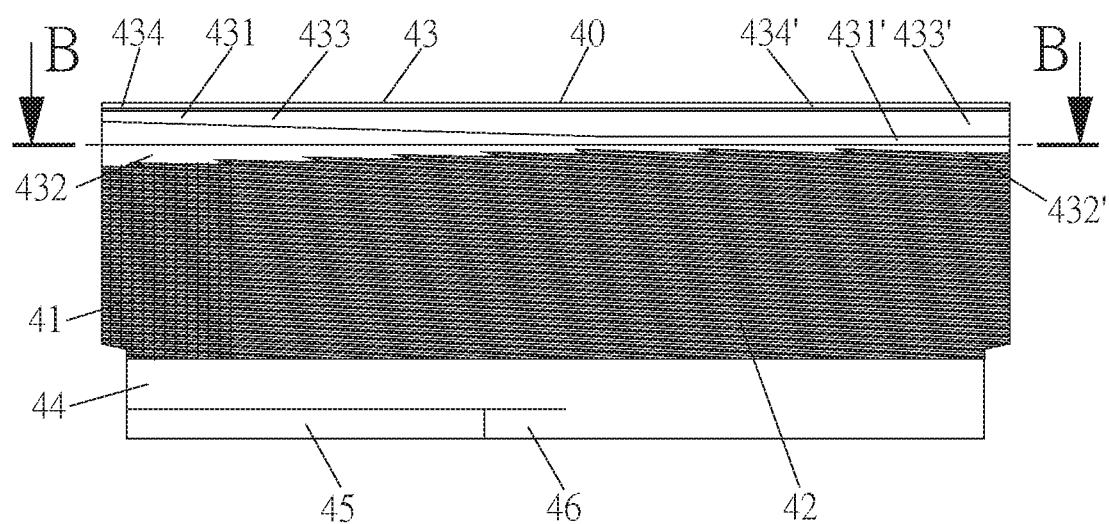
FIG. 10 is a front view of the threading die as shown in FIG. 9.
Figure 11:
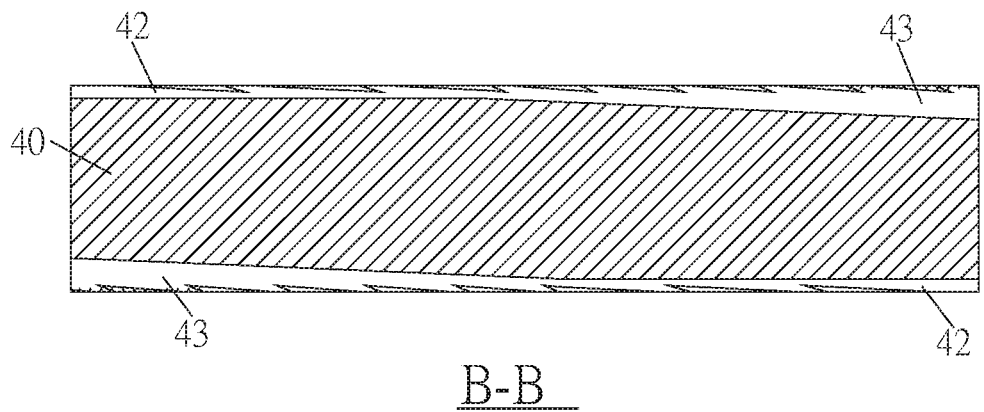
FIG. 11 is a cross-sectional view of the threading die taken along line "B-B" as shown in FIG. 10.

In operation, referring to FIGS. 7 and 8 with reference to FIGS. 5 and 6, a metal bracket 3 is mounted on a wall 4, an inner board 2 is mounted on the metal bracket 3, and an outer board 1 is mounted on the inner board 2. The outer board 1 has a thickness larger than that of the inner board 2. When the rotation head 32 is rotated by a driving tool, the shank 30 is rotated, such that the drilling tip 37 is driven to drill holes into the outer board 1, the inner board 2 and the metal bracket 3 as shown in FIG. 7. At the same time, the external thread 36 is screwed into the metal bracket 3. When the stop flange 34 is moved to contact the inner board 2 as shown in FIG. 8, movement of the external thread 36 is stopped, and the working is finished. At the same time, the fixing plate 31 rests on the outer board 1.

Referring to FIGS. 9-16 with reference to FIGS. 5 and 6, the shank 30 is worked by two threading dies 40. Each of the two threading dies 40 has a structure with a front face and a rear face opposite to each other. Each of the two threading dies 40 is provided with an external thread forming section 42 corresponding to the external thread 36 of the shank 30. Each of the two threading dies 40 is provided with a notch 43 located at a top of the external thread forming section 42 and corresponding to the stop flange 34 of the shank 30. The notch 43 includes an upper ramp 431 or 431' and a lower ramp 432 or 432'. The notch 43 has a dimension (or width) decreased gradually from a starting position (at the upper ramp 431 and the lower ramp 432) to an ending position (at the upper ramp 431' and the lower ramp 432') thereof. The notch 43 has a top provided with an insert 433 or 433'. The insert 433 or 433' has a dimension (or width) increased gradually from a starting position (at the insert 433) to an ending position (at the insert 433') thereof. The insert 433 or 433' has a top provided with a recessed corner 434 or 434'. The recessed corner 434 or 434' has a flat shape. The insert 433 or 433' and the recessed corner 434 or 434' are inserted into the top of the external thread 36 to form the groove 35 in the shank 30, and squeeze downward an extruded portion formed during formation of the groove 35 to form the stop flange 34, such that the shank 30 is formed integrally with the external thread 36 and the stop flange 34. Thus, the shank 30 is squeezed during threading of the external thread 36 to integrally form the stop flange 34.

In the preferred embodiment of the present invention, each of the two threading dies 40 is provided with an antiskid section 41 located at a starting position of the external thread forming section 42.

In the preferred embodiment of the present invention, each of the two threading dies 40 is provided with an opening 44 and a plane 45 corresponding to the drilling tip 37 of the shank 30. The plane 45 has a rear end provided with an arcuate face 46. Thus, the drilling tip 37 of the shank 30 extends into and is hidden in the opening 44 during threading of the external thread 36 and during squeezing of the stop flange 34, such that the drilling tip 37 is not damaged during working of the two threading dies 40.

Figure 12:
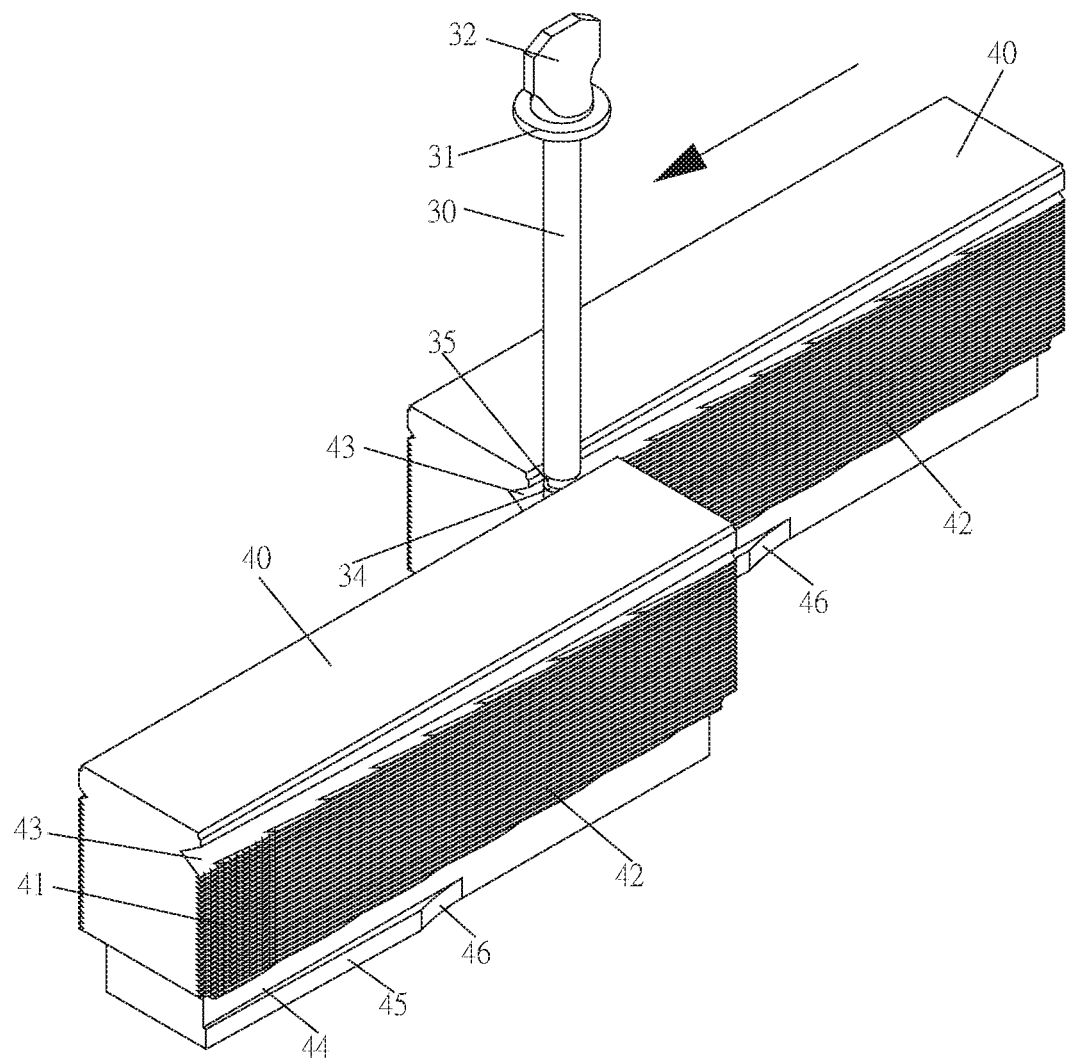
FIG. 12 is a perspective operational view showing the start state of threading of the self-tapping screw.
Figure 13:
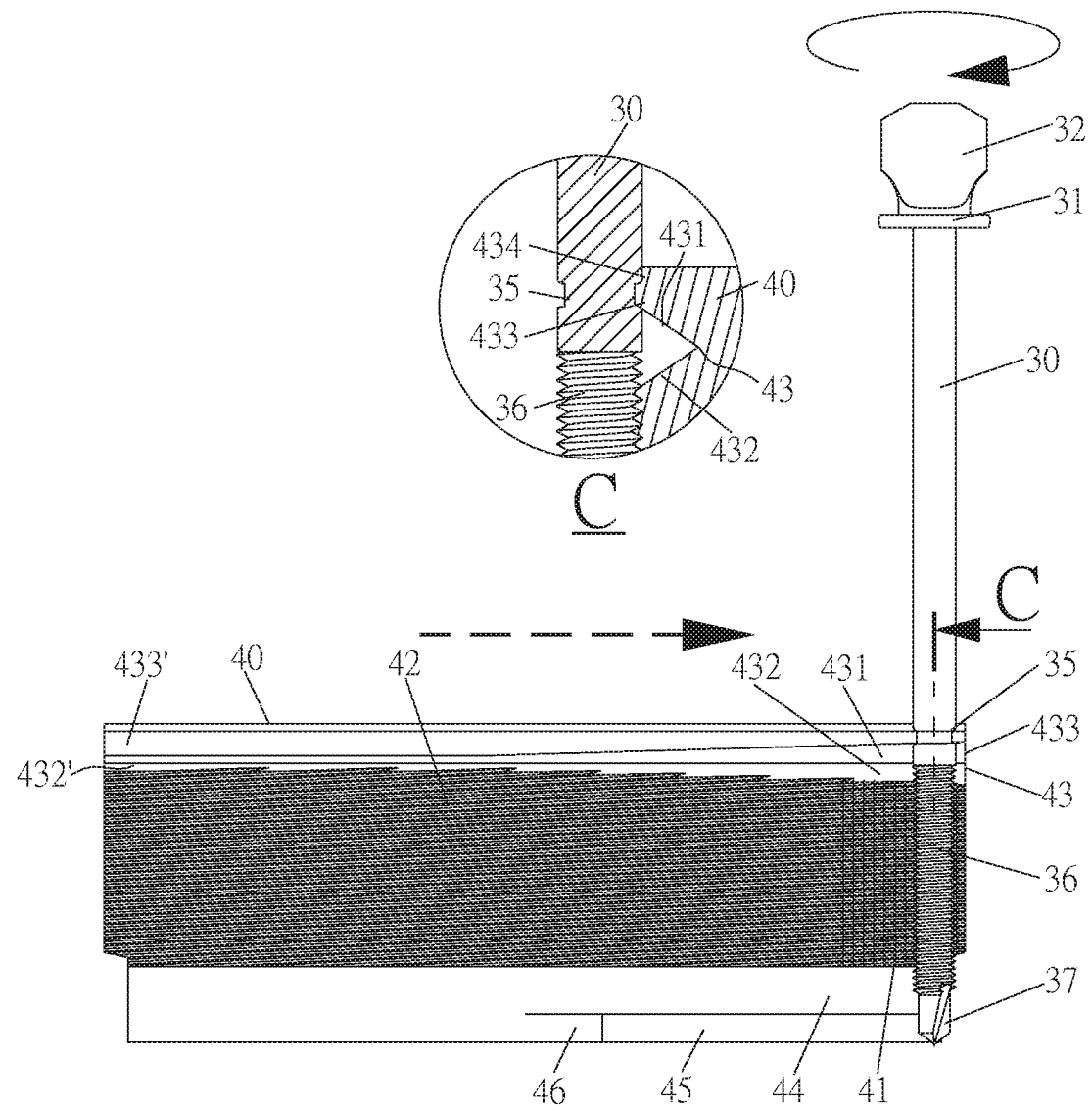
FIG. 13 is a plane operational view showing the start state of threading of the self-tapping screw, and a cross-sectional view taken along mark "C".

As shown in FIGS. 12 and 13, the shank 30 is sandwiched between the two threading dies 40 and located at the antiskid section 41 of each of the two threading dies 40. Then, one of the two threading dies 40 is fixed, and the other one of the two threading dies 40 is moved. In such a manner, the external thread forming section 42 of each of the two threading dies 40 performs threading and the notch 43 of each of the two threading dies 40 performs squeezing simultaneously, such that the shank 30 is integrally formed with the external thread 36 and the stop flange 34 simultaneously. At the same time, the insert 433 or 433' and the recessed corner 434 or 434' are inserted into the top of the external thread 36 to form the groove 35 in the shank 30.

Figure 14:
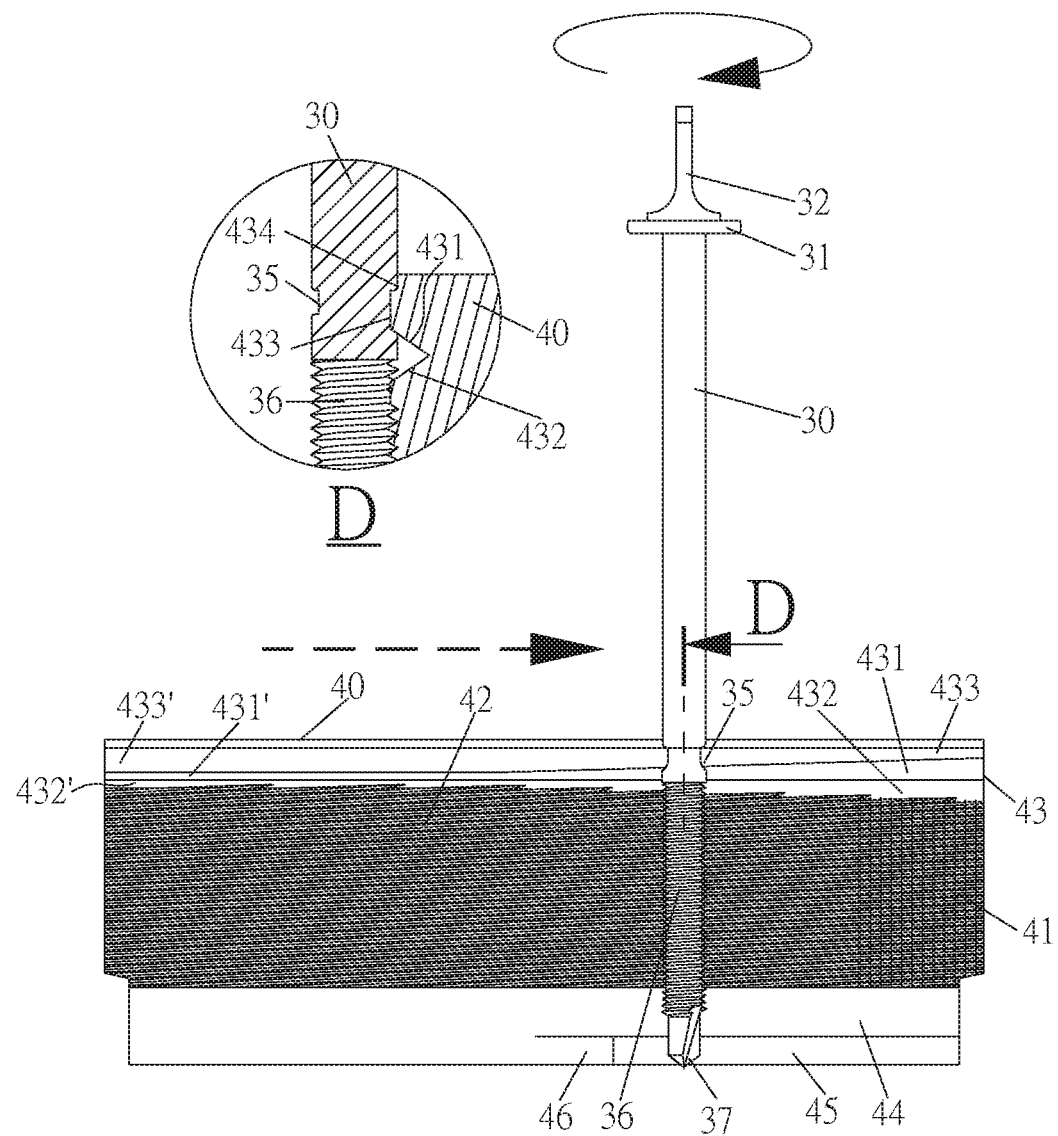
FIG. 14 is a plane operational view showing threading of the self-tapping screw, and a cross-sectional view taken along mark "D".

As shown in FIG. 14, the width of the insert 433 or 433' is increased gradually from the starting position (at the insert 433) to the ending position (at the insert 433') thereof, such that the material for forming the groove 35 is gradually squeezed and extruded downward to form the stop flange 34. At the same time, the stop flange 34 is squeezed gradually by the upper ramp 431 or 431' of the notch 43 to form the conic face 342 of the stop flange 34.

Figure 15:
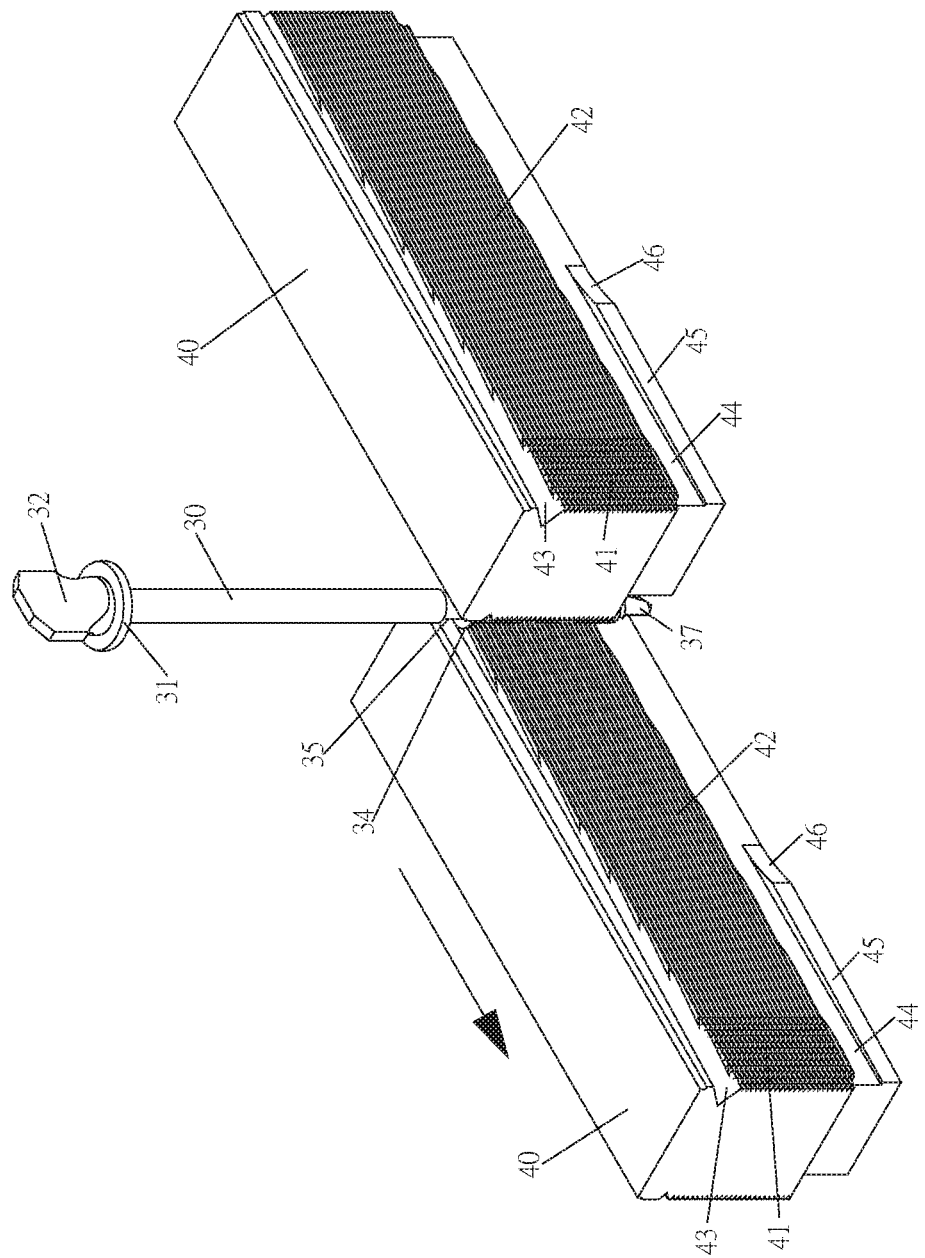
FIG. 15 is a perspective operational view showing the finished state of threading of the self-tapping screw.
Figure 16:
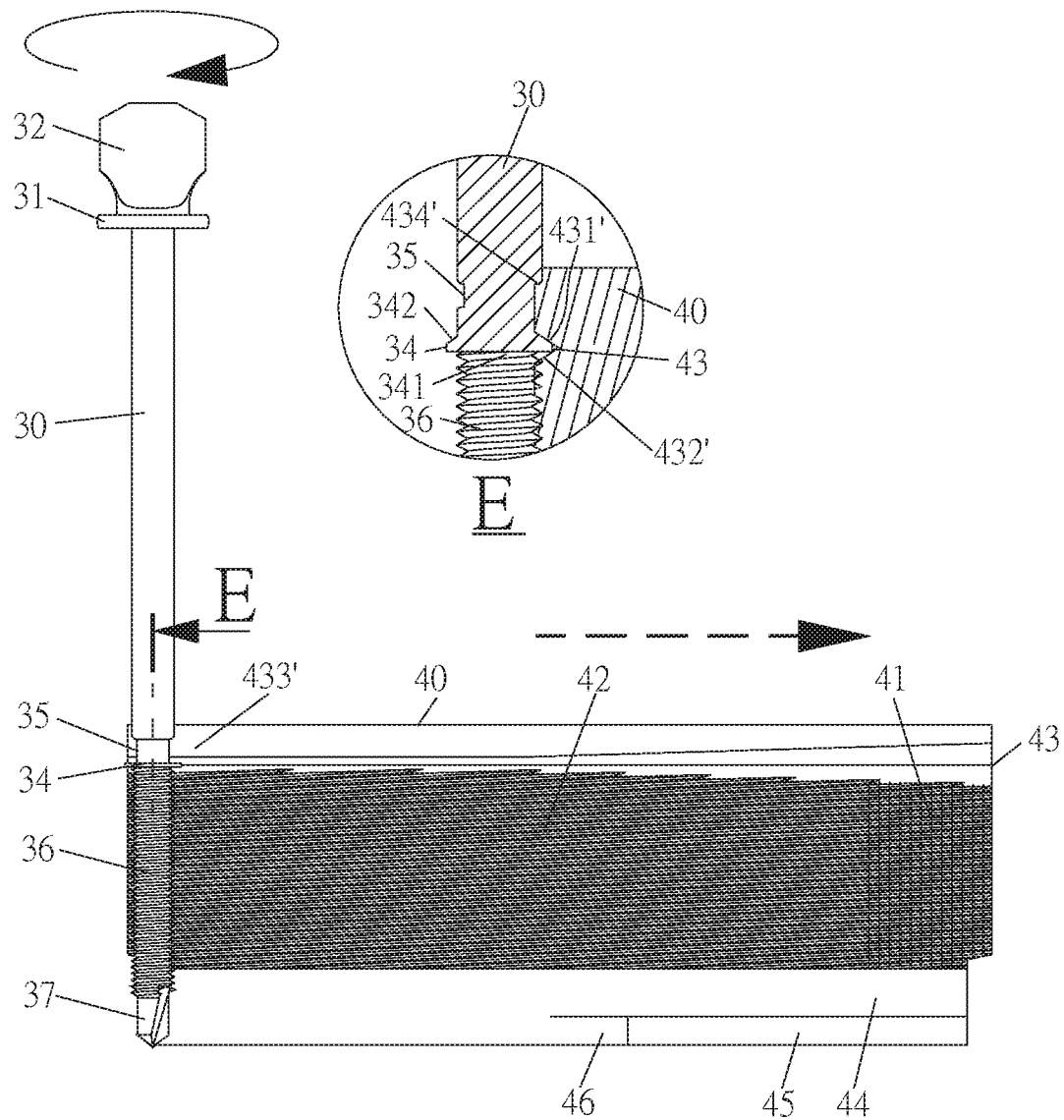
FIG. 16 is a plane operational view showing the finished state of threading of the self-tapping screw, and a cross-sectional view taken along mark "E".

As shown in FIGS. 15 and 16, when the two threading dies 40 finish the threading work, the top of the external thread 36 is squeezed to form the stop flange 34 simultaneously, such that the shank 30 is integrally formed with the stop flange 34.

Accordingly, the external thread forming section 42 of each of the two threading dies 40 performs threading on the rotating shank 30, and the notch 43 of each of the two threading dies 40 performs squeezing on the rotating shank 30 simultaneously, such that the shank 30 is integrally formed with the external thread 36 and the stop flange 34. In addition, the shank 30 is integrally formed with the stop flange 34, to stop and prevent the external thread 36 from being fed and locked excessively due to an undue working, an erroneous assembly process or improper operation of the user, thereby preventing the shank 30 from being worn out or broken during operation.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A method for forming a stop flange on a self-tapping screw, comprising:
    locating a shank of a self-tapping screw between two threading dies;
    each of the two threading dies having an external thread forming section;
    each of the two threading dies having a notch located at a top of the external thread forming section;
    the notch including an upper ramp and a lower ramp;
    the notch having a dimension decreased gradually from a starting position to an ending position thereof;
    the notch having a top provided with an insert;
    the insert having a dimension increased gradually from a starting position to an ending position thereof;
    the insert having a top provided with a recessed corner;
    the recessed corner having a flat shape;
    fixing one of the two threading dies and moving the other one of the two threading dies to work the shank of the self-tapping screw;
    the external thread forming section of each of the two threading dies performing threading to form an external thread on the shank of the self-tapping screw;
    inserting the insert and the recessed corner of each of the two threading dies into a top of the external thread to form a groove in the shank of the self-tapping screw; and
    the insert of each of the two threading dies gradually squeezing downward an extruded portion that is formed during formation of the groove to form a stop flange on the shank of the self-tapping screw by the extruded portion.

2. The method as claimed in claim 1, wherein the external thread forming section of each of the two threading dies performs threading, and the insert of each of the two threading dies performs squeezing simultaneously, to form the external thread and the stop flange on the shank of the self-tapping screw simultaneously.

3. The method as claimed in claim 1, wherein the extruded portion formed during formation of the groove is gradually squeezed and extruded downward to form the stop flange by pressing of the notch having a dimension decreased gradually from a starting position to an ending position thereof and by pressing of the insert having a dimension increased gradually from a starting position to an ending position thereof.

4. The method as claimed in claim 1, further comprising:
    the upper ramp of the notch of each of the two threading dies gradually squeezing the stop flange of the self-tapping screw to form a conic face on the stop flange of the self-tapping screw.

5. The method as claimed in claim 1, wherein:
    each of the two threading dies is provided with an antiskid section located at a starting position of the external thread forming section; and
    the shank of the self-tapping screw is located between the two threading dies and clamped by the antiskid section of each of the two threading dies.

6. The method as claimed in claim 1, wherein:
    each of the two threading dies is provided with an opening and a plane corresponding to a drilling tip of the shank;
    the plane has a rear end provided with an arcuate face; and
    the drilling tip of the shank extends into and is hidden in the opening during threading of the external thread and during squeezing of the stop flange.

* * * * *